Feb. 11, 1936.   O. L. LEWIS   2,030,260
MOTORIZED REDUCTION GEAR ASSEMBLY
Original Filed Dec. 21, 1932   2 Sheets-Sheet 2
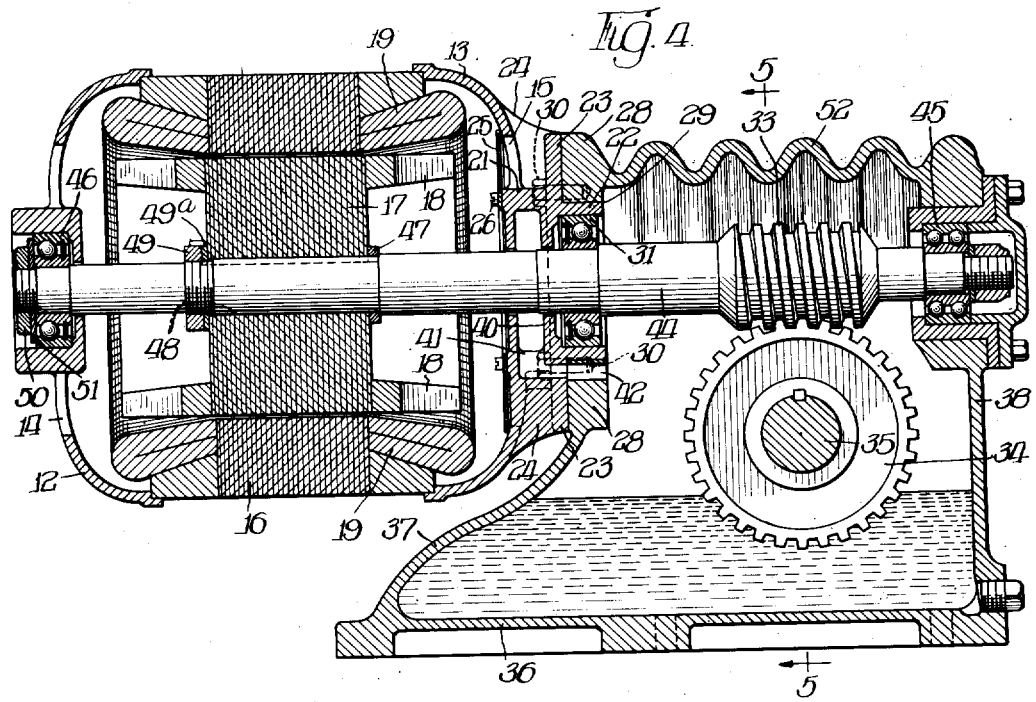
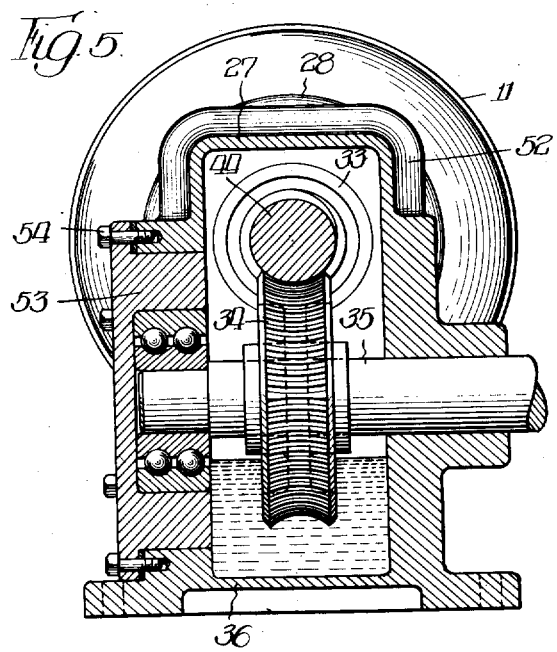
Inventor:
Otto L. Lewis, Patented Feb. 11, 1936

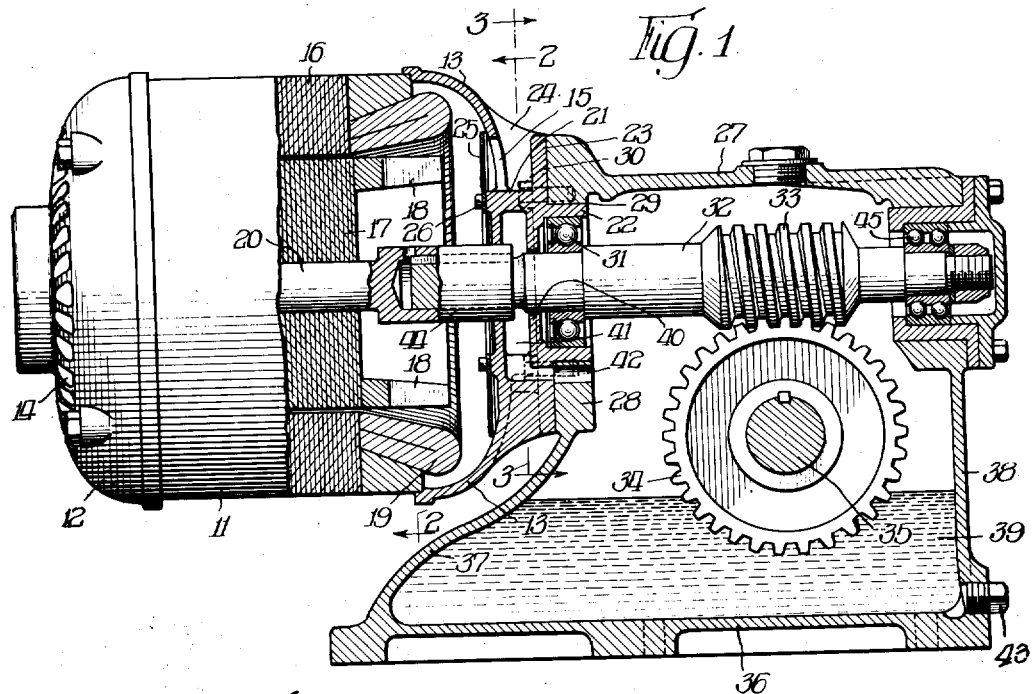
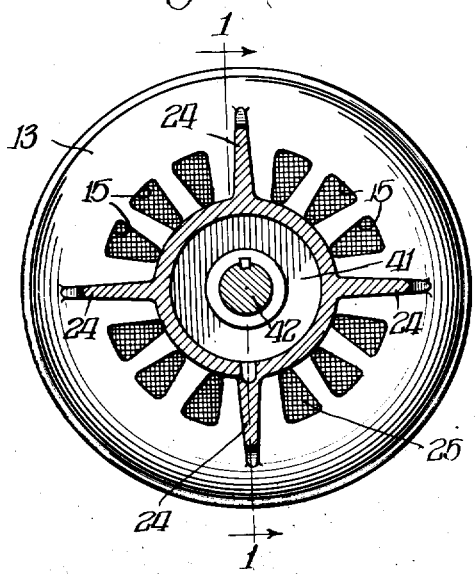
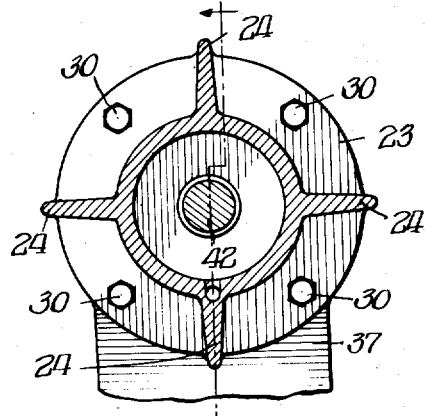

2,030,260

UNITED STATES PATENT OFFICE 2,030,260

MOTORIZED REDUCTION GEAR ASSEMBLY

Otto L. Lewis, Chicago, Ill., assignor to Foote Bros. Gear & Machine Co., Chicago, Ill., a corporation of Illinois Application December 21, 1932, Serial No. 648,189

5 Claims. (Cl. 172—36)

The invention has for its primary object the provision of a unitary assembly of electric motor and speed reduction transmission gear, whereby is attained a most compact machine and a rigid coupling connection between the driving and driven mechanisms, assuring proper setting up of the two and minimizing the possibility of subsequent failure of coordination due to maladjustment.

Subordinate but important features of the invention are the mutually supporting pedestal, the provision for motor cooling, oil distribution, inspection and adjustment, ease and accuracy of assembly, and other advantages in construction and operation which will be evident to those skilled in the art from the disclosure of the following detailed description and the accompanying drawings.

In the drawings,

Fig. 1 is a side elevation of one embodiment of the invention, largely in longitudinal section taken on the line 1—1 of Figs. 2 and 3;

Figs. 2 and 3 are respectively transverse sections on the lines 2—2 and 3—3 of Fig. 1 looking in opposite directions;

Fig. 4 is a longitudinal section through another embodiment; and

Fig. 5 is a transverse section on the line 5—5 of Fig. 4.

While the invention is illustrated and described as embodying in the assembly a driven speed reduction gear, it will be clear that the assembly is applicable to the inclusion, instead of other mechanism adaptable to direct drive from an electric motor.

For purposes of exemplification, having reference to Figs. 1, 2 and 3 of the drawings, the numeral 11 designates a motor housing having end plates 12 and 13 provided with annular series of ventilating apertures 14 and 15 in the two end plates. The motor includes the usual stator 16 and rotor 17, fan blades 18, coils 19 and shaft 20.

Differing from the conventional motor housing, the end plate 13 is provided, within the annular series of ventilating openings, with a cylindrical extension neck 21, 22 and on said neck intermediate the portions 21 and 22 a radial flange 23. The flange 23 is connected with the end plate 13 at intervals between ventilating openings by means of radial fins 24, preferably four in number, which serve to reinforce said flange and to provide interspaces giving access to the ventilating openings 15. Advantageously two of the ribs or fins 24 are vertically arranged and the other two horizontally to facilitate the shedding of any small article which might fall into the space between the end plate and flange and to obviate the formation of pockets by which any such object might be directed into the ventilating openings; a further safeguard for the ventilating openings 15 is a screen 25 disposed within the end plate 13 opposite said openings and there held in place by the screw bolts 26.

The reduction gear housing 27 has an end wall or plate 28 properly machined to a fitting contact against the adjacent face of the flange 23 and such end plate is provided with a central opening at 29 having an inside diameter corresponding to the outside diameter of the neck portion 22, whereby it is adapted to receive and to center the same.

Securing bolts 30, preferably four in number but non-symmetrically spaced, pass through the flange 23 and are threaded into the end plate 28 of the gear housing. It is to be noted that the heads of these bolts lie one within each of the spaces bounded by the end plate 13, the flange 23 and two fins 24, giving ready access to said bolts for assembling and disassembling the machine, and the non-symmetrical spacing of the bolts assuring proper positioning of the two housings.

The neck portion 22, fitting within the opening 29 of the gear housing, serves as a journal box for the anti-friction bearings 31 disposed between the neck portion 22 and the reduction gear shaft 32 which carries the worm 33 in mesh with the worm wheel 34 keyed upon the driven shaft 35 of the reduction gear train.

The elements of the reduction gear train are not shown herein as the details of such train themselves form no essential part of the present invention.

The lower portion of the pedestal which supports and forms an enlargement of the gear housing is unsymmetrical in relation to the gear assembly in that the hollow base 36, adapted to contain oil, extends well beneath the motor casing 11, one wall 37 of the pedestal being correspondingly projected beneath and in vertically spaced relation to the motor housing while the other wall 38 is substantially vertical whereby the center of gravity of the gear and motor assembly falls within the said supporting pedestal and the volume of oil subject to heating by the gear train may be largely augmented and the cooling area of the walls also greatly increased. The space 39 within the pedestal serves to accommodate gears of the reduction train and also as a reservoir for oil beneath the surface of which the worm wheel 34 dips and carries oil to the worm 33, whence a portion travels along the shaft to the bearings at each side of the wheel, and part runs down the wall 40 of the neck 21 into the space 41 and thence through the drain 42 back to the reservoir from which it may, from time to time, be removed at the opening closed by the plug 43 when the oil is to be changed.

The motor housing and the gear housing being accurately positioned and fixedly connected as hereinabove described, the motor shaft 20 and the gear shaft 32 may be rigidly connected by means of the sleeve coupling 44 whereby the motor and the reduction gear mechanisms constitute in effect a unitary assembly, firmly supported upon the one pedestal.

In Figs. 4 and 5 is illustrated a modified construction which, in some respects, is preferable, especially where the assembly is originally manufactured as one unit. Herein the driving motor and the driven gear train are substantially identical with that previously described, but differences exist in the consolidation of the motor driving shaft and the driven gear train shaft in an integral unit and the gear train housing is designed for more efficient heat radiation.

The one shaft 44 extends throughout both motor and gear train. The shaft is journaled at the right hand end in double radial and end thrust bearings 45 and intermediate its length in a floating radial single bearing 31 as before, and at the opposite end in a self-aligning floating bearing 46. The motor is assembled with the shaft 44 by slipping the same upon the shaft from the left into abutment against the collar 47 which bears against a shoulder on the shaft, applying the key 48 and nut 49 with lock washer 49ª, inserting the bearings 46 and screwing up the end nut 50 upon the lock washer 51, whereby is attained a secure assembly.

The interior of the gear train housing is subject to the generation of much heat particularly adjacent the engagement of the worm 33 and worm wheel 34 and it is therefore important to provide for efficient heat dissipation and oil distribution. To this end I provide not only for an enlarged oil capacity but also on the upper portion of the housing 27 I form heat radiating ribs 52, as for instance by the employment of corrugated sheet metal in the forming of the housing adjacent the gears or by casting the ribs thereon. The employment of heat-dissipating ribs formed by corrugating the upper portion of the housing is preferable for the reason that not only do the convolutions increase the exterior cooling surface but interiorly they act as oil spreaders, distributing the oil in a thin film over the internal surface and thereby increasing the area over which the oil is subjected to the cooling effect. Side plates 53, removably attached by bolts 54, give access to the interior of the housing and the gear train elements therein.

I claim:

1. A motorized transmission gear train assembly comprising a motor housing and a gear housing arranged end to end with the motor shaft and the gear shaft rigidly coupled in axial alignment, that end plate of the motor housing adjacent the gear housing provided with an annular series of ventilating openings and within the annulus an extension neck with a radially extending flange disposed intermediate its length to provide an interspace giving access to the ventilating openings, the end plate of the gear housing having a central opening about the gear shaft to receive and center the neck end, the adjacent faces of the flange and gear housing end plate having fitted contact, and securing bolts transfixing said flange and gear housing end plate.

2. A motorized transmission gear train assembly comprising a motor housing and a gear housing arranged end to end with the motor shaft and the gear shaft rigidly coupled in axial alignment, that end plate of the motor housing adjacent the gear housing provided with an annular series of ventilating openings and within the annulus an extension neck coaxial with the motor shaft and having a radially extending plane flange disposed intermediate its length, reinforcing radial fins connecting the flange and motor end plate to provide interspaces giving access to the ventilating openings, said fins being disposed at an angle to each other of not less than 90° and one substantially vertical, the end plate of the gear housing having a central opening about the gear shaft to receive and center the neck end, the adjacent faces of the flange and gear housing end plate having fitted contact, and securing bolts transfixing said flange and gear housing end plates.

3. A motorized transmission gear train assembly comprising a motor housing and a gear housing arranged end to end with the motor shaft and the gear shaft rigidly coupled in axial alignment, that end plate of the motor housing adjacent the gear housing provided with an annular series of ventilating openings and within the annulus an extension neck coaxial with the motor shaft and having a radially extending plane flange disposed intermediate its length, reinforcing radial fins connecting the flange and motor end plate to provide interspaces giving access to the ventilating openings, said fins being disposed at an angle to each other of not less than 90° and one substantially vertical, the end plate of the gear housing having a central opening about the gear shaft to receive and center the neck end, journal bearings for the gear shaft disposed within the neck end as a journal box, the adjacent faces of the flange and gear housing end plate having fitted contact over substantially the whole area of the flange, and securing bolts transfixing said flange and gear housing end plate, the gear housing formed in its lower portion as a pedestal, the base of which pedestal and one side wall thereof extend beneath and in spaced vertical relation to the motor housing whereby to support both the motor and the gear train upon a common pedestal.

4. A motorized transmission gear train assembly comprising a motor housing and a gear housing arranged end to end with the motor shaft and the gear shaft rigidly coupled in axial alignment, that end plate of the motor housing adjacent the gear housing provided with an annular series of screened ventilating openings and within the annulus an extension neck with a radially extending flange disposed intermediate its length, reinforcing means connecting the flange and motor end plate to provide an interspace giving access to the ventilating openings, the end plate of the gear housing having a central opening about the gear shaft to receive and center the neck end, the adjacent faces of the flange and gear housing end plate having fitted contact, and securing bolts transfixing said flange and gear housing end plate.

5. A motorized transmission gear train assembly comprising a motor housing and a gear housing arranged end to end with the motor shaft and the gear shaft rigidly coupled in axial alignment, that end plate of the motor housing adjacent the gear housing provided with an annular series of ventilating openings and within the annulus an extension neck with a radially extending flange disposed intermediate its length to provide an interspace giving access to the ventilating openings, the end plate of the gear housing having a central opening about the gear shaft to receive and center the neck end, the adjacent faces of the flange and gear housing end plate having fitted contact, and securing bolts transfixing said flange and gear housing end plate, that portion of the gear housing surrounding the drive shaft provided with heat-radiating convolutions.

OTTO L. LEWIS.